United States Patent [19]
Flewwelling et al.

[11] 3,915,450
[45] Oct. 28, 1975

[54] LESSENING THE IMPACT ON A SOLID BODY STRIKING THE SURFACE OF WATER OR THE LIKE

[75] Inventors: Herbert Martin Flewwelling, Pointe Claire; Denis Michael Harvey, Baie d'Urfe, both of Canada

[73] Assignee: Domtar Limited, Montreal, Canada

[22] Filed: Jan. 15, 1973

[21] Appl. No.: 323,854

Related U.S. Application Data
[63] Continuation of Ser. No. 99,840, Dec. 21, 1970, abandoned.

[52] U.S. Cl. ................... 272/1 B; 61/6; 4/172.16
[51] Int. Cl.² ................................. E04H 3/18
[58] Field of Search ............ 272/1 B, 26, 65, 66; 210/169, 220; 4/172, 172.15, 172.16, 172.17, 180; 261/77, 124; 209/170; 128/66; 61/1 R, 6, 20

[56] References Cited
UNITED STATES PATENTS

| | | | |
|---|---|---|---|
| 498,668 | 5/1893 | Lytell | 272/26 |
| 843,926 | 2/1907 | Brasher | 61/6 |
| 1,478,703 | 12/1923 | Dolbear | 209/170 X |
| 1,982,258 | 11/1934 | Martin | 261/124 X |
| 2,241,337 | 5/1941 | Work | 261/124 X |
| 2,325,937 | 8/1943 | Brasher | 61/1 R X |
| 2,540,948 | 2/1951 | Jeffery | 261/124 X |
| 2,676,921 | 4/1954 | Vansteenkiste | 210/169 |
| 2,699,117 | 1/1955 | LaPrairie | 61/6 X |
| 2,744,065 | 5/1956 | Lacey | 210/169 |
| 2,793,640 | 5/1957 | Schwartz | 4/180 X |
| 2,848,203 | 8/1958 | Misiura | 261/124 |
| 2,860,600 | 11/1958 | Cheney | 61/6 UX |
| 3,031,685 | 5/1962 | Baumann | 261/124 X |
| 3,045,829 | 7/1962 | Rule et al. | 210/169 |
| 3,153,682 | 10/1964 | Walker | 261/124 |
| 3,154,602 | 10/1964 | Geiger | 261/124 X |
| 3,214,151 | 10/1965 | Meunier | 261/124 X |
| 3,232,866 | 2/1966 | Morgan | 209/170 X |
| 3,293,861 | 12/1966 | Hinde | 261/124 X |
| 3,324,829 | 6/1967 | DeJose et al. | 210/169 X |
| 3,367,325 | 2/1968 | O'Keefe | 128/66 |
| 3,555,783 | 1/1971 | Grimshaw | 261/124 X |
| 3,605,131 | 9/1971 | Brazel et al. | 4/172.16 |
| 3,615,013 | 10/1971 | Reece | 210/169 |

FOREIGN PATENTS OR APPLICATIONS

| | | | |
|---|---|---|---|
| 481,828 | 3/1938 | United Kingdom | 210/169 |

*Primary Examiner*—Richard J. Apley

[57] ABSTRACT

Disclosed is a method of lessening the impact on a solid body, e.g., the body of a diver, when it strikes the surface of water. A localized region of turbulence is created in the water by discharging air under pressure below the surface of the water at such a rate that substantial compressibility is imparted, at least temporarily, to the water in that region and the apparent density and viscosity of the water are reduced. A swimming pool equipped with means for discharging air below the surface of the water and thereby forming a dispersion of air bubbles in the water, is shown.

2 Claims, 2 Drawing Figures

U.S. Patent  Oct. 28, 1975  Sheet 1 of 2  3,915,450
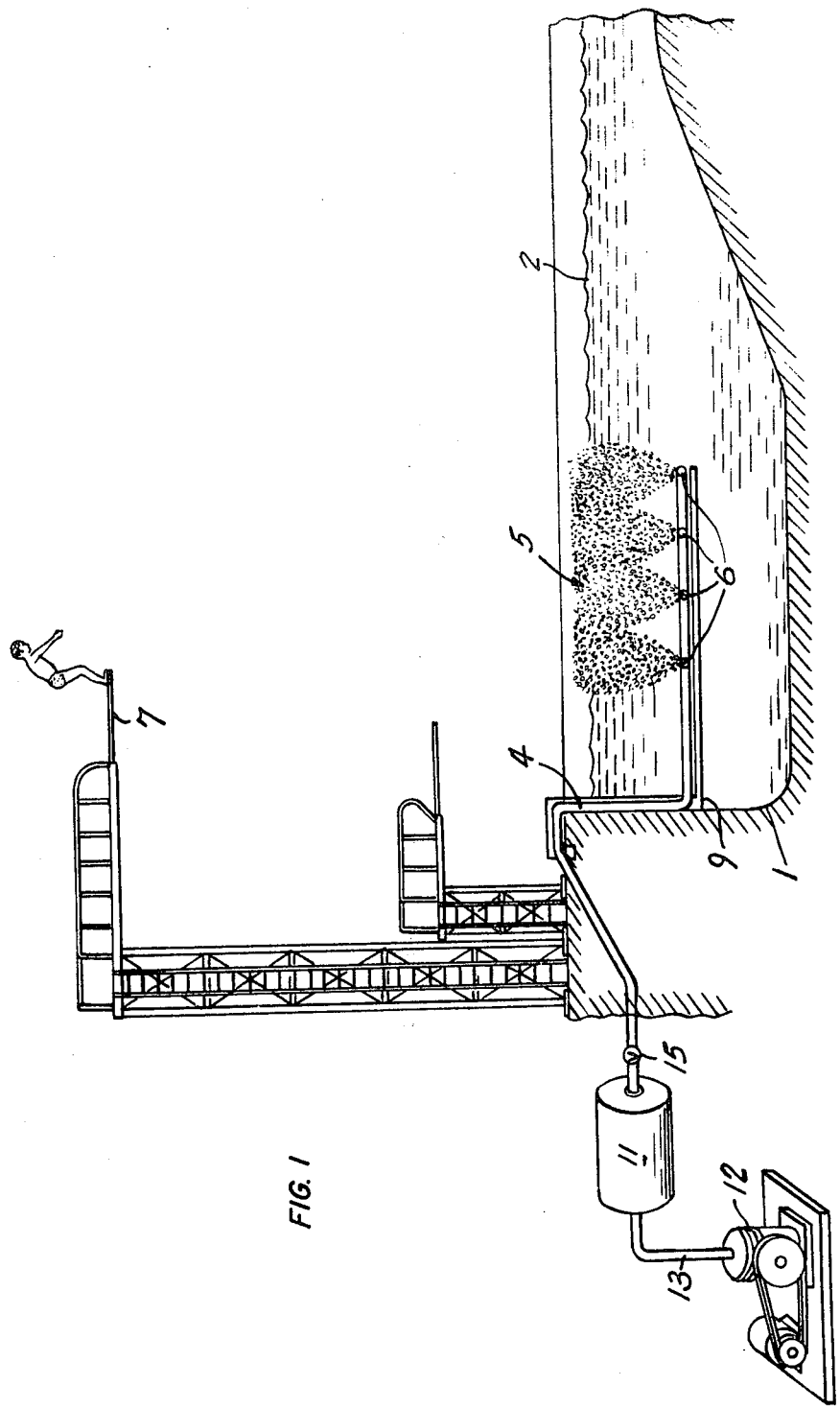
FIG. 1
INVENTORS
Herbert Martin FLEWWELLING
Denis Michael HARVEY
PATENT AGENT

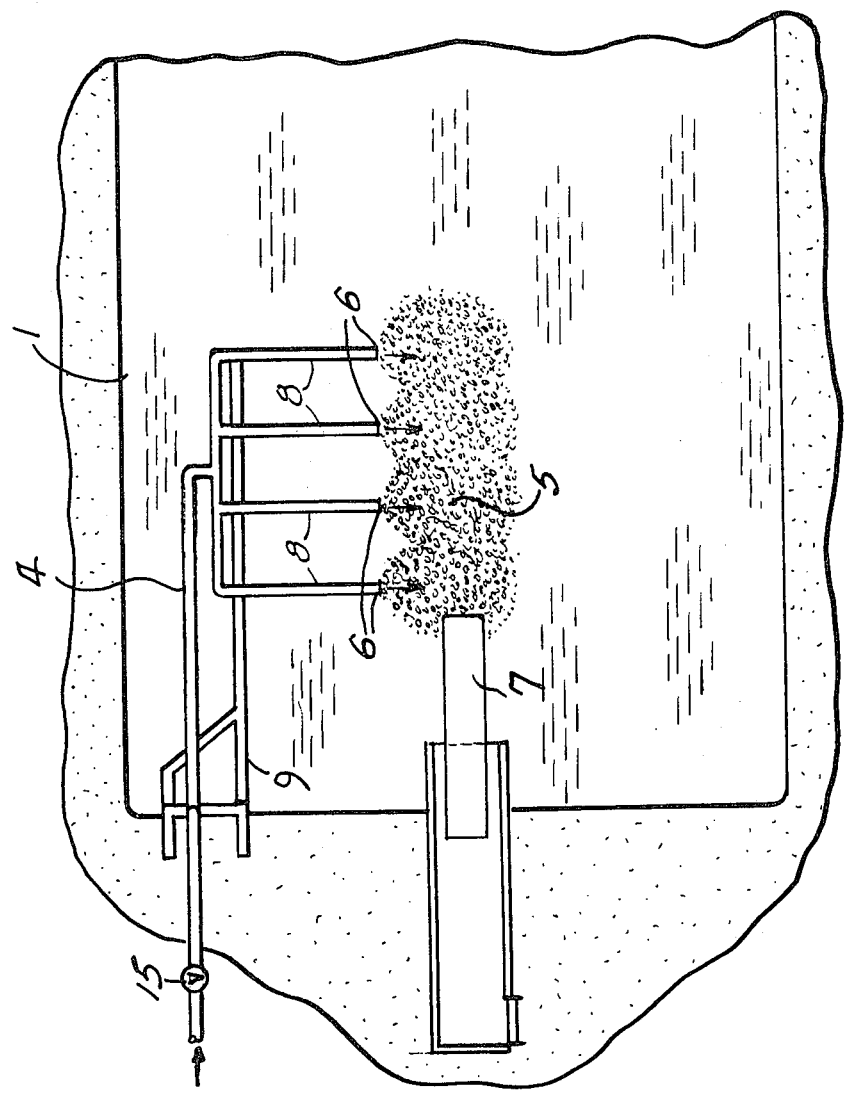

LESSENING THE IMPACT ON A SOLID BODY STRIKING THE SURFACE OF WATER OR THE LIKE

This application is a continuing application of U.S. application 99,840 filed Dec. 21, 1970 and now abandoned.

FIELD OF THE INVENTION

The present invention relates to a method of reducing the force of impact upon a solid body when it strikes and penetrates a liquid. More particularly, it relates to a method and means of lessening the impact on the body of a diver at the moment it strikes the surface of the water.

DESCRIPTION OF THE PRIOR ART

It is well known that inexperienced divers often are hurt and on occasion seriously injured when they strike the water with their body at an inappropriate angle. Water being substantially incompressible, the force of impact between the body of the diver and the mass of water is extremely high. Accidents of this kind may result in serious injury and are therefore a serious deterrent to the development of the sport of diving.

The present invention teaches a method and apparatus for reducing the force of impact between the body of the diver and the mass of water thereby to reduce or eliminate the dangers associated with diving. This has proved of great help to beginners in the art of aerial acrobatics, and even to experts when they first attempt a new and difficult dive.

It is known to discharge air into bodies of water below the surface thereof for various purposes, e.g., to prevent ice formation in harbours, to provide aeration where oxygen in the water is depleted, to aerate liquid sewage, and the like. In all these applications it is desired to distribute the air as widely as possible in the body of water, preferably in the form of very small bubbles, to ensure a large area of contact between the air and the water. Discharge of air under pressure through sea-water, the air appearing in the form of enormous bubbles, was also proposed for the purpose of reducing sea-waves and swell with simultaneous deicing or inhibiting of the formation of ice; and also for the purpose of protecting marine structures (e.g., for drilling oil wells) from damage by floating ice.

The concept underlying the present invention is the creation of a localized area in a pool of water where those physical properties of the water which chiefly affect the impact on the diver's body, notably its lack of compressibility as well as its density and viscosity, are modified to the extent where the impact is negligible even when the dive is improperly executed. We have found that by discharging air under pressure below the surface of the water in a selected area we can impart to the water in the area sufficient compressibility to create a cushion effect which substantially lessens the impact upon the body of the diver and thereby lessens the danger associated with the dive. Simultaneously the apparent density of the water is reduced due to the dispersion of air bubbles therein, and similarly the viscosity is lowered. The total effect is to lessen the force of impact by increasing the distance over which deceleration of the body occurs.

SUMMARY OF THE INVENTION

The present invention provides a method of reducing the force of impact upon a solid body when it strikes the surface of water which method comprises creating in said body of water a localized region of substantial turbulence by forming a dispersion of gas bubbles in the water in said region adjacent the surface thereof, the amount of gas dispersed in the water being, at least momentarily, such that substantial compressibility is imparted to the water in said region and the apparent density and viscosity of the said water are substantially reduced, and causing the said body to strike the surface of the water within said region.

The present invention also provides a diving apparatus comprising a pool of water of sufficient size and depth to permit the performance of diving acts, means submerged in said pool for discharging air under pressure below the surface of said pool, said means comprising a conduit for the gas and outlet means from said conduit adapted to discharge gas at a high rate thereby to form a dispersion of gas bubbles in a selected region of said pool adjacent the surface thereof, and means supplying air under pressure to said means submerged in the pool.

BRIEF DESCRIPTION OF THE DRAWING

The invention will be further explained in the description below and reference should be made to the accompanying drawings wherein:

FIG. 1 is a diagrammatic representation of the present invention showing, in side view, part of a swimming pool fitted with the apparatus of the present invention, and FIG. 2 shows a top view of the same part of the swimming pool.

DESCRIPTION OF THE PREFERRED EMBODIMENTS

To obtain the localized effect referred to above, it is necessary to discharge a sufficient amount of air into a limited region and to disperse the air in the form of a multiplicity of bubbles substantially throughout the said region. We have found that to impart to the water sufficient compressibility to lessen the shock to a body falling into it, the percentage by volume of air dispersed in the water at the moment of impact should be at least about 10%, but to create conditions of relative safety for dives from various heights, it is preferable that the content of air be between about 30 and 60 % by volume. To obtain such a high volume of air dispersed in water in the selected region it will be necessary to discharge the air at a high rate, substantially close to the area where the turbulent region is to be created. The turbulence need not extend to any great depth and we have found that a depth of 2 to 4 feet is adequate to amortize the shock in most cases, however the discharge can take place at any depth provided the turbulence extends upwards to the surface of the water and there are suffcient bubbles adjacent the surface to impart to the water the necessary degree of compressibility.

The localized turbulence may be maintained continuously, if desired, but the large volume of air under pressure that would be necessary for continuous operation would make it quite expensive. As an alternative, the air may be released momentarily, just before the dive, at a sufficient rate to create the necessary dispersion of air in the water and the dive should follow substantially immediately, or within seconds, from the discharge of air, at any rate before too many of the released bubbles have risen to the surface and escaped. The surface occupied by the region of turbulence may be varied according to need and must, in any case, be sufficient to allow for stray dives and miscalculations by beginners.

The air is discharged under sufficient pressure to overcome the hydrostatic head and to propel the air bubbles with sufficient speed from the point of discharge, so that on rising to the surface they reach the designated area and create the desired turbulence in the said area. Thus, the pressure will depend on the depth of submergence of the point of air injection and its distance from the selected area where turbulence is to be created. (It will be appreciated that for safety reasons the point of air injection may have to be removed from the actual diving area and be placed a certain distance away.) We have found pressures between about 50 and 200 p.s.i. suitable, but pressures outside this range can also be used. Any suitable source of compressed air may be used, e.g., a high pressure tank connected with a compressor, with a conduit for the air leading from the source to the point of discharge below the surface of the water. The rate of discharge must be sufficiently high to achieve the desired result, as explained above, the rate depending on the extent of the area of turbulence desired, the degree of turbulence and so on. The surface of the water becomes raised within the diving area above the surface of the surrounding pool: this further increases the depth of the turbulent region and facilitates the lateral displacement of the water at the moment of impact.

The invention will be further explained with reference to the accompanying drawings illustrating the turbulence created in a selected diving area on the surface of a swimming pool as well as the means for creating the same. A swimming pool designated as 1 is filled with water the level of which is designated as 2. In a selected area of the pool, e.g., the area beneath a diving platform 7, a zone of turbulence generally indicated as 5 is created by the release of compressed air from a pipe through a suitable outlet or outlets. The pipe 4 is supported on a rigid support 9 at the desired depth and the pipe outlets 6 are located so that the gas bubbles, due to the pressure of the air and the resulting velocity imparted to the bubbles, will be directed to the general area of the pool selected as the area of turbulence. According to whether the pressure is greater or less, the pipe outlets 6 may be more or less distant from the selected area, and at greater or less depth. The pipe may have several outlet branches 8, as shown, or a single outlet, and may be of any suitable material, e.g. plastic or metal, care being taken however, particularly in the case of metal pipe, that it should not be in the line of diving and well outside any likely stray jump, as injury may result to the diver. While the pipe 4 is shown in the drawings as laid over the edge of the pool to the desired depth, following the longitudinal wall, and then turned inside towards the selected area of turbulence, other arrangements are possible, e.g., the pipe may be brouhgt in through an opening in the side wall or in the bottom of the pool to a suitable distance from the selected area. The outlets could also be built in the bottom or side of the pool. While only one pipe 4 is shown in the drawings, two or several pipes may be laid focussing on the region of turbulence, each pipe with single or several outlets as desired.

As shown in FIG. 1, the pipe is connected to tank 11 containing compressed air. The tank in turn is connected by means of pipe 13 with compressor 12 which is used for building up the pressure in the tank to the required level. Compressed air is released, e.g., by means of valve 15 into the pool, the release of pressure being carried out as desired, either continuously or intermittently for brief periods of time.

In one embodiment of the invention, a swimming pool having the standard dimensions of 50 meters by 13 meters, and a depth (at the diving end) of 15 feet, was equipped with apparatus as described, namely a two-stage reciprocating compressor (made by Atlas-Copco), a pressure tank, and a conduit leading from the tank into the pool. The conduit was a rubber, high-pressure base of about 1½ inches internal diameter terminating in four branches constituted by tubes of about three-fourths inch diameter. The tubes were of polyvinylchloride, laid horizontally, and were flexible. The length of each tube was 9 feet and the distance between outlets was about 4 feet. A quick-acting valve corresponding to valve 15 of the drawings controlled the discharge of air.

The air from the tank was released under pressure of about 150 p.s.i. at a depth of over 5 feet below the surface of the water. Substantially instantaneously a region of turbulence was created extending over an area of about 5 feet by 15 feet and to a depth of about 5 feet. The rate of air discharge was about 1000 cu. ft/min. and the amount of air in the region constituted about 50 % by volume. Jumps executed in a variety of postures into the zone of turbulence thus created, have indicated a very substantial lessening of the impact on the body of the diver.

The concepts herein described are susceptible of many variations. Essentially, they provide a method and apparatus for imparting a measure of compressibility to otherwise incompressible liquids such as water and for the using of this temporary alteration in the physical property of the water to lessen the impact created upon contact between a falling body and the water, e.g., to increase the safety of diving.

We claim:

1. A method of reducing the force of impact on a solid body as it strikes and penetrates a body of water comprising the steps of
   a. discharging gas under pressure at a depth beneath the surface of said body of water into a limited region of said body of water;
   b. dispersing said gas in said limited region of said body of water and flowing said gas upward toward the surface of said water thereby forming a bubbling turbulent region substantially co-extensive with said limited region, said pressure being selected to overcome the hydrostatic head and propel the air bubbles with sufficient speed from the point of discharge to create the turbulence in said region;
   (c) said discharging of said gas being at a rate sufficient to have said dispersion of gas occupy about 10 to 60 % by volume of said limited region thereby substantially reducing the apparent density and viscosity of the water within said region;
   d. discontinuing said discharge after a finite period of time sufficient to cause said turbulent region;
   e. impacting said solid body upon said surface in said turbulent region momentarily after the formation of said turbulent region and substantially at the time of said discontinuation of said discharge.

2. A method as defined in claim 1, wherein said gas occupies between about 30 % and 60 % by volume of said limited region.

* * * * *